US010176390B2

(12) United States Patent
Chen et al.

(10) Patent No.: US 10,176,390 B2
(45) Date of Patent: Jan. 8, 2019

(54) METHOD AND SYSTEM FOR MOVING OBJECT DETECTION WITH SINGLE CAMERA

(71) Applicant: HONDA MOTOR CO., LTD., Tokyo (JP)

(72) Inventors: Sheng Chen, Corvallis, OR (US); Alper Ayvaci, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/002,822

(22) Filed: Jun. 7, 2018

(65) Prior Publication Data

US 2018/0285662 A1 Oct. 4, 2018

Related U.S. Application Data

(63) Continuation of application No. 15/349,556, filed on Nov. 11, 2016, now Pat. No. 10,019,637.

(Continued)

(51) Int. Cl.
*G06K 9/00* (2006.01)
*H04N 7/18* (2006.01)
(Continued)

(52) U.S. Cl.
CPC ..... *G06K 9/00805* (2013.01); *G06K 9/00744* (2013.01); *G06K 9/00785* (2013.01); *G06K 9/623* (2013.01); *G06K 9/6277* (2013.01); *G06T 7/204* (2013.01); *G06T 7/2006* (2013.01); *G06T 7/2093* (2013.01); *G06T 7/215* (2017.01); *G06T 7/246* (2017.01); *G06T 7/285* (2017.01);
(Continued)

(58) Field of Classification Search
USPC ........ 382/100, 103, 106–107, 154–155, 162, 382/168, 173, 181, 190, 209, 224, 232, 382/254, 274, 276, 286–291, 305, 312; 348/159
See application file for complete search history.

(56) References Cited

U.S. PATENT DOCUMENTS

2007/0116356 A1* 5/2007 Gong ................. G06K 9/38
382/173
2011/0200230 A1* 8/2011 Luke ................. G06K 9/00791
382/103
(Continued)

OTHER PUBLICATIONS

German Office Action of related German application 102016222267.8, dated Dec. 4, 2017.
(Continued)

*Primary Examiner* — Seyed H Azarian
(74) *Attorney, Agent, or Firm* — Arent Fox LLP

(57) ABSTRACT

Disclosed are systems and methods for detecting moving objects. A computer-implemented method for detecting moving objects comprises obtaining a streaming video captured by a camera; extracting an input image sequence including a series of images from the streaming video; tracking point features and maintaining a set of point trajectories for at least one of the series of images; measuring a likelihood for each point trajectory to determine whether it belongs to a moving object using constraints from multi-view geometry; and determining a conditional random field (CRF) on an entire frame to obtain a moving object segmentation.

17 Claims, 24 Drawing Sheets

Related U.S. Application Data

(60) Provisional application No. 62/255,289, filed on Nov. 13, 2015.

(51) Int. Cl.
   *G06K 9/62* (2006.01)
   *G06T 7/20* (2017.01)
   *G06T 7/215* (2017.01)
   *G06T 7/292* (2017.01)
   *G06T 7/246* (2017.01)
   *G06T 7/285* (2017.01)

(52) U.S. Cl.
   CPC .......... *G06T 7/292* (2017.01); *G06K 2209/21* (2013.01); *G06T 2207/10016* (2013.01); *G06T 2207/30241* (2013.01); *G06T 2207/30261* (2013.01)

(56) References Cited

U.S. PATENT DOCUMENTS

| | | | | |
|---|---|---|---|---|
| 2012/0044355 A1* | 2/2012 | Jamtgaard | | G01S 5/00 348/159 |
| 2012/0274781 A1 | 11/2012 | Shet et al. | | |
| 2013/0294651 A1* | 11/2013 | Zhou | | G06K 9/00355 382/103 |
| 2013/0329987 A1 | 12/2013 | Gong | | |
| 2015/0170006 A1 | 6/2015 | Cohen | | |
| 2015/0371397 A1* | 12/2015 | Wang | | G01B 11/14 382/159 |

OTHER PUBLICATIONS

Hartley, R.; Zisserman, A.: Multiple View Geometry in Computer Vision. Second Edition, Cambridge University Press, 2004, pp. 279-292.

Kitt, B.: Effiziente Schätzung dichter Bewegungsvektorfelder unter Berücksichtigung der Epipolargeometrie zwischen unterschiedlichen Ansichten einer Szene. In: Schriftenreihe Institut für Mess-und Regelungstechnik, Karlsruher Institut für Technologie (KIT), vol. 27, 2013, pp. 1-5, pp. 9-20, 35-39, pp. 69-73.

Krause, J.: Lecture 2 Introduction to Segmentation. In: Stanford University Kurs CS231B: "The Cutting Edge of Computer Vision", as at Jan. 4, 2015. URL http://vision.stanford.edu/teaching/cs231b_spring1415/slides/lecture2_segmentation_notes.pdf [searched on Nov. 22, 2017].

Müller, A.; Behnke, S: Learning Depth-Sensitive Conditional Random Fields for Semantic Segmentation of RGB-D Images. In: IEEE International Conference on Robotics and Automation (ICRA), 2014.

* cited by examiner

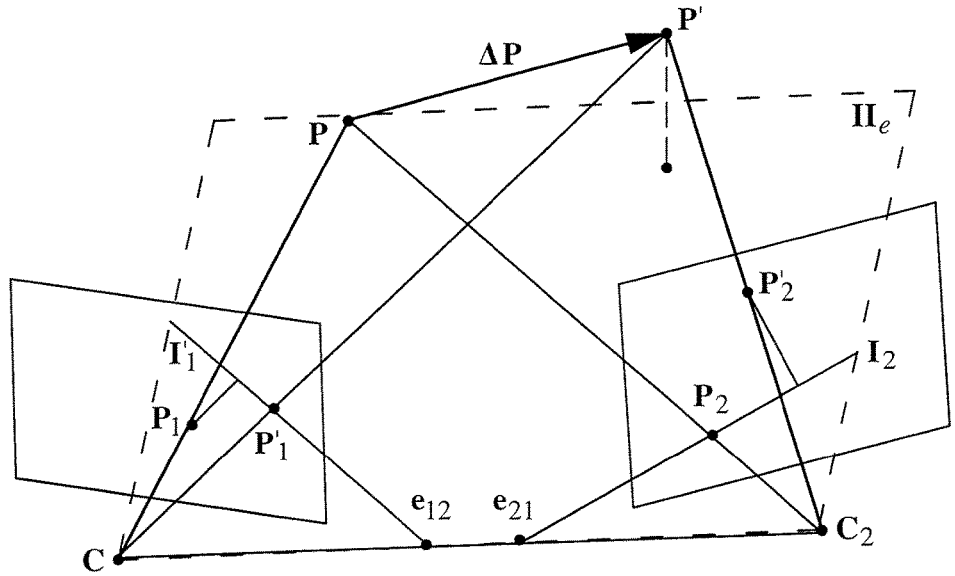

- Mathematically:

$$p_i'^T F p_i = 0$$

$$F = K'^{-T}[t]_\times R K^{-1}$$

$$\begin{bmatrix} x_i' & y_i' & 1 \end{bmatrix} \begin{bmatrix} f_{11} & f_{12} & f_{13} \\ f_{21} & f_{22} & f_{23} \\ f_{31} & f_{32} & f_{33} \end{bmatrix} \begin{bmatrix} x_i \\ y_i \\ 1 \end{bmatrix} = 0$$

$$x_i x_i' f_{11} + x_i y_i' f_{21} + x_i f_{31} + \\ y_i x_i' f_{12} + y_i y_i' f_{22} + y_i f_{32} + \\ x_i' f_{13} + y_i' f_{23} + f_{33} = 0$$

- F: 3*3 fundamental matrix
- $p_i'$, $p_i$: corresponding points in two frames
- t: camera translation
- R: camera rotation
- K, K': camera intrinsic param

FIG. 2

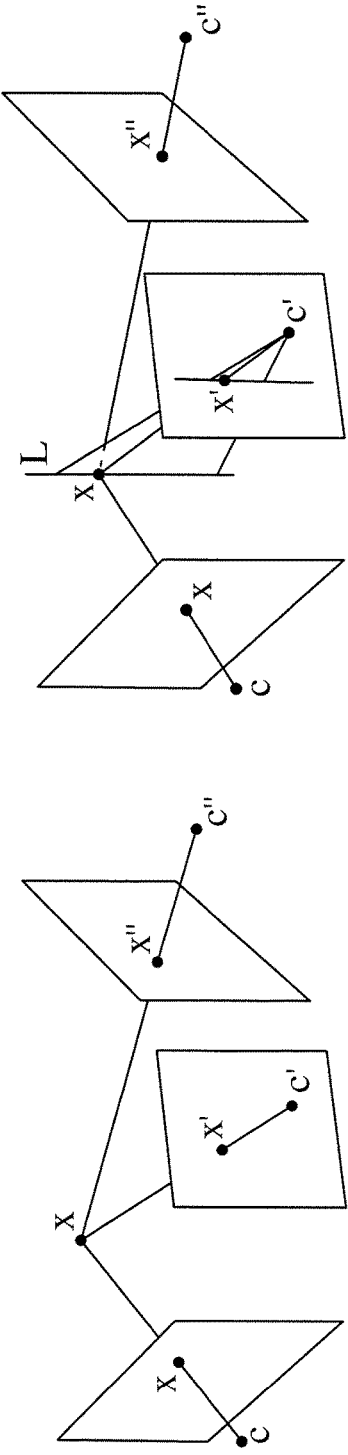
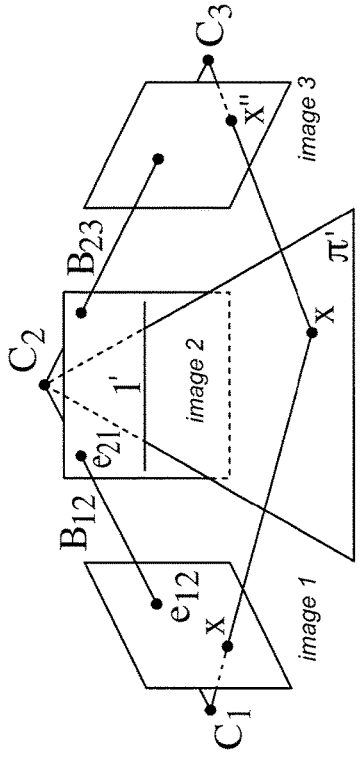

Point-point-point correspondence          Point-line-point correspondence (i) Line-line-line correspondence $l^T[T_1, T_2, T_3]l'' = l^T$ or $(l^T[T_1, T_2, T_3]l'')[l']_\times = 0^T$ (ii) Point-line-line correspondence $l'^T(\sum_i x^i T_i)l'' = 0$ for a correspondence $x \leftrightarrow l' \leftrightarrow l''$ (iii) Point-line-point correspondence $l'^T(\sum_i x^i T_i)[x'']_\times = 0^T$ for a correspondence $x \leftrightarrow l' \leftrightarrow x''$ (iv) Point-point-line correspondence $[x']_\times (\sum_i x^i T_i) l'' = 0$ for a correspondence $x \leftrightarrow x' \leftrightarrow l''$ (v) Point-point-point correspondence $[x']_\times (\sum_i x^i T_i)[x'']_\times = 0_{3\times 3}$

FIG. 8

METHOD AND SYSTEM FOR MOVING OBJECT DETECTION WITH SINGLE CAMERA

RELATED APPLICATION

This application is a continuation of U.S. patent application Ser. No. 15/349,556, filed Nov. 11, 2016, entitled "METHOD AND SYSTEM FOR MOVING OBJECT DETECTION WITH SINGLE CAMERA," which claims priority to U.S. Provisional Application No. 62/255,289, filed Nov. 13, 2015, entitled "METHOD AND SYSTEM FOR MOVING OBJECT DETECTION WITH SINGLE CAMERA," the content these applications is hereby incorporated by reference in its entirety.

FIELD OF DISCLOSURE

Aspects of the present disclosure relate to a method and system for detecting moving objects by segmenting moving objects in a streaming video taken from a single monocular camera. More particularly, aspects of the present disclosure relate to obtaining and analyzing an input image sequence including a plurality of time frames $\{I_1, I_2, I_3 \ldots I_t\}$, and determining and outputting, for each $I_t$, a binary mask $Y_t$, where each element in $Y_t$ indicates whether a corresponding pixel belongs to a moving object or not.

SUMMARY OF THE DISCLOSURE

The present disclosure may track point features online and maintain a set of point trajectories. For each point trajectory, the likelihood may be measured to determine whether it may belong to a moving object using constraints from multi-view geometry. Further, based on the responses received from the point trajectories, a conditional random field (CRF) may be formulated on an entire frame to obtain a moving object segmentation.

Additional advantages and novel features of these aspects of the disclosure will be set forth in part in the description that follows, and in part will become more apparent to those skilled in the art upon examination of the following or upon learning by practice of the disclosure.

BRIEF DESCRIPTION OF THE DRAWINGS

Various example aspects of the systems and methods will be described in detail, with reference to the following figures, wherein:

FIG. 2 illustrates the concept of epipolar constraint and related mathematical equations;

FIG. 3 illustrates an example optical flow between consecutive frames for generating point trajectories, according to various aspects of the present disclosure;

FIG. 8 illustrates the concept of trifocal constraint and related mathematical equations;

DETAILED DESCRIPTION

These and other features and advantages of this disclosure are described in, or are apparent from, the following detailed description of various example aspects. It may be evident, however, that such aspects may be practiced without these specific details.

Figure 1:
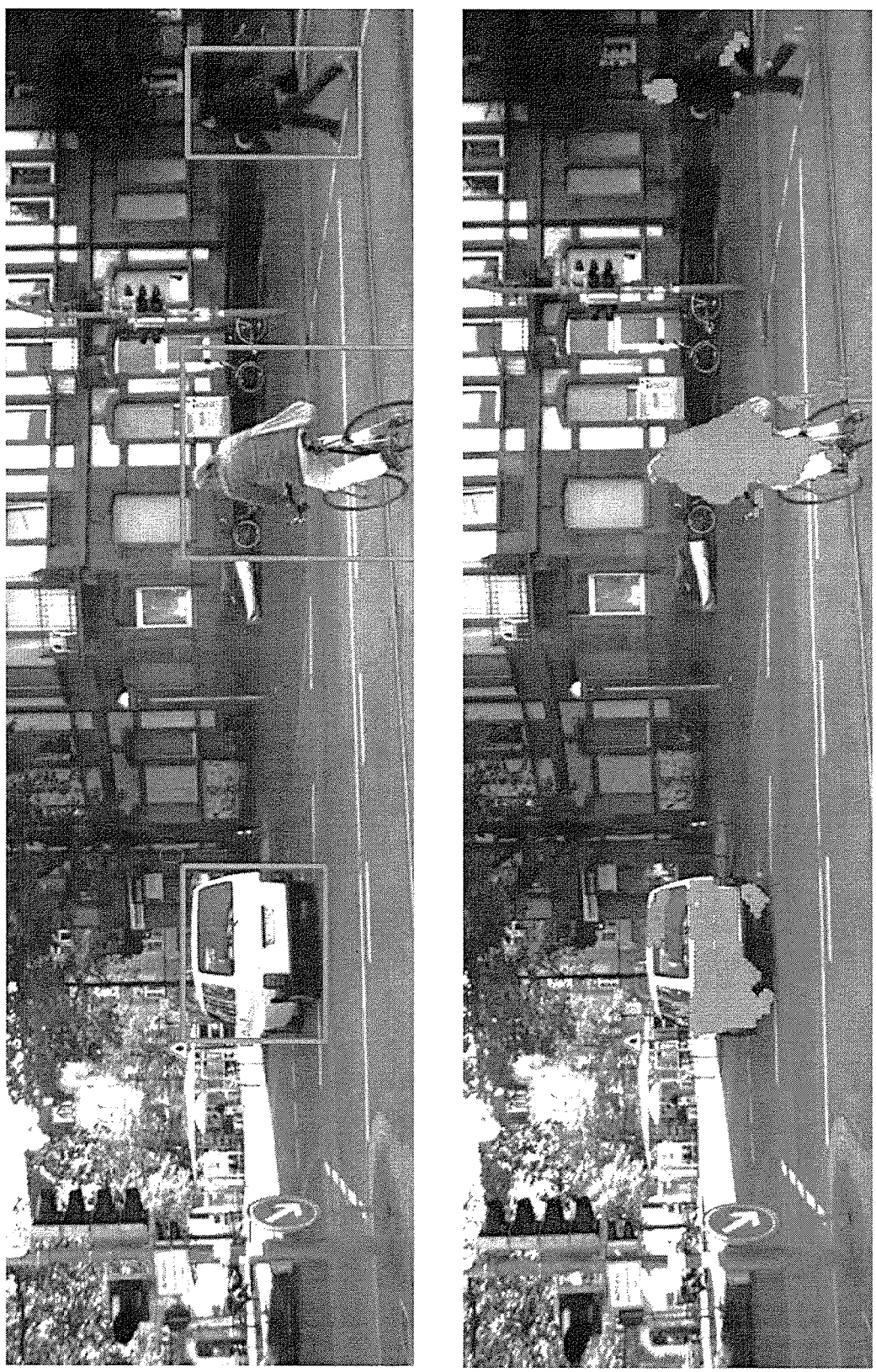
FIG. 1 illustrates an example of tracking and detecting various moving objects including a moving van, a cyclist and a walking pedestrian on a public street, according to various aspects of the present disclosure.

Referring to FIG. 1, the present disclosure, among other features, detects moving objects in a streaming video captured by a single camera, e.g., moving vehicles, pedestrians and essentially any moving object. Detection of moving objects and motion-based tracking are important to activity recognition, traffic monitoring, and automotive safety. For example, in the case of driving, moving objects are usually important in terms of safety concerns. Moreover, occlusions may occur when the view of a moving object is blocked completely or partially by other objects. When there is partial occlusion, it may be difficult to detect the moving object from still images. However, if the moving parts may be detected in a video, that might help resolve the occlusion issue. As shown in FIG. 1, for each frame of a video taken by a monocular camera, a binary mask or a set of segments for each moving object (e.g., the moving van on the left, the cyclist in the middle, and the pedestrian on the right) may be output to indicate whether a pixel belongs to a moving object or not. Here, a binary mask may refer to a binary image with the same size as the image being processed, and the mask may contain 1's for all pixels that are part of the region of interest, and 0's everywhere else. According to aspects of the present disclosure, a binary mask of an entire frame may be output, where each pixel may be labeled as moving or static. To achieve this goal at frame t, forward and backward optical flow field may be computed up till frame t and a set of long term point trajectories may be formed. Each trajectory may be represented by a set of points. Every trajectory in the current set may end at the current frame t. Each trajectory may be assigned a moving objectness score based on the geometry which indicates whether a trajectory is on a moving object or not. The scores on each trajectory may be used to partition the image into moving and static object regions.

The state of motion (interchangeably referred to herein as moving objectness) of an object may be measured using geometry. For example, in the most basic case, when a camera is moving in a strictly forward direction, a person generally sees all the static points moving away from the camera center and has a focus of expansion in a center of an image. Cues for detecting moving objects may include appearance and compactness, among other cues. For example, in dealing with motion segmentation, point trajectories may be extracted and clustering may be performed on these trajectories based on properties such as velocity. However, while this approach performs clustering, there may be a lack of comprehension about which clusters correspond to real moving objects. Alternatively, post processing may be performed to extract moving objects by examining the color, among other factors. Subspace tracking may also be conducted based on the assumption that an orthographic camera model is used, with all background point trajectories lying in a low dimensional space. Moreover, an ego-motion compensated background subtraction may be carried out in moving object detection by applying local affine transformations to a prior frame to compensate for the camera motion followed by a background subtraction to obtain a moving mask.

According to aspects of the present disclosure, selected geometric constraints may be used to obtain motion cues, especially considering that an object may transition from being still to moving or the other way around. Let $I: D \subset R^2 R^2 \times Z^+ \to R^+; (x,t) \to I_t(x)$ be an image sequence defined on domain D and $I_t$ denotes the frame at time t. Feature points in the image sequence I may be tracked, and a set of trajectories $Z_t = \{Z_{i,\tau}^t\}_{i=1}^N$ may be constructed, where for each trajectory, $\tau$ is the initial frame and t is the final or current frame. The trajectory $z_{i,\tau}^t$ may be represented by a set of points $\{x_i^\tau, x_i^{\tau+1}, \ldots, x_i^t\}$. For each frame, a score may be assigned to these trajectories for determining whether they are on a moving or a static object. Moving objectness scores may be additionally utilized to partition the image domain into regions of static and moving objects. In an image sequence I, trajectories on static objects may follow geometric constraints induced by a camera motion.

Geometric motion constraints may be more informative than cues like appearance among others. Real motion cues may be needed to capture the transition of a car from a moving to a still state, for example.

When a camera is static, 3D points may project onto the same point in the image plane, while the camera moves, the projection of the static 3D points may move on the image plane due to the camera motion and may follow certain constraints. As such, to detect a moving object, or to be more specific, to measure the motion of point trajectories, two kinds of multi-view geometry information may be used, namely, the epipolar constraint between two-views, and the trifocal constraints from three-views. The shifts in the projections of a still point in a scene in different views may be caused by the camera motion. Assuming that most of the points in the scene are still, relative camera pose changes from the point correspondences may be estimated. The points on the moving objects may generally be the outliers of such estimations, and the motion of a point may thus be measured as to how it fits the model.

Epipolar Constraint

Figure 4:
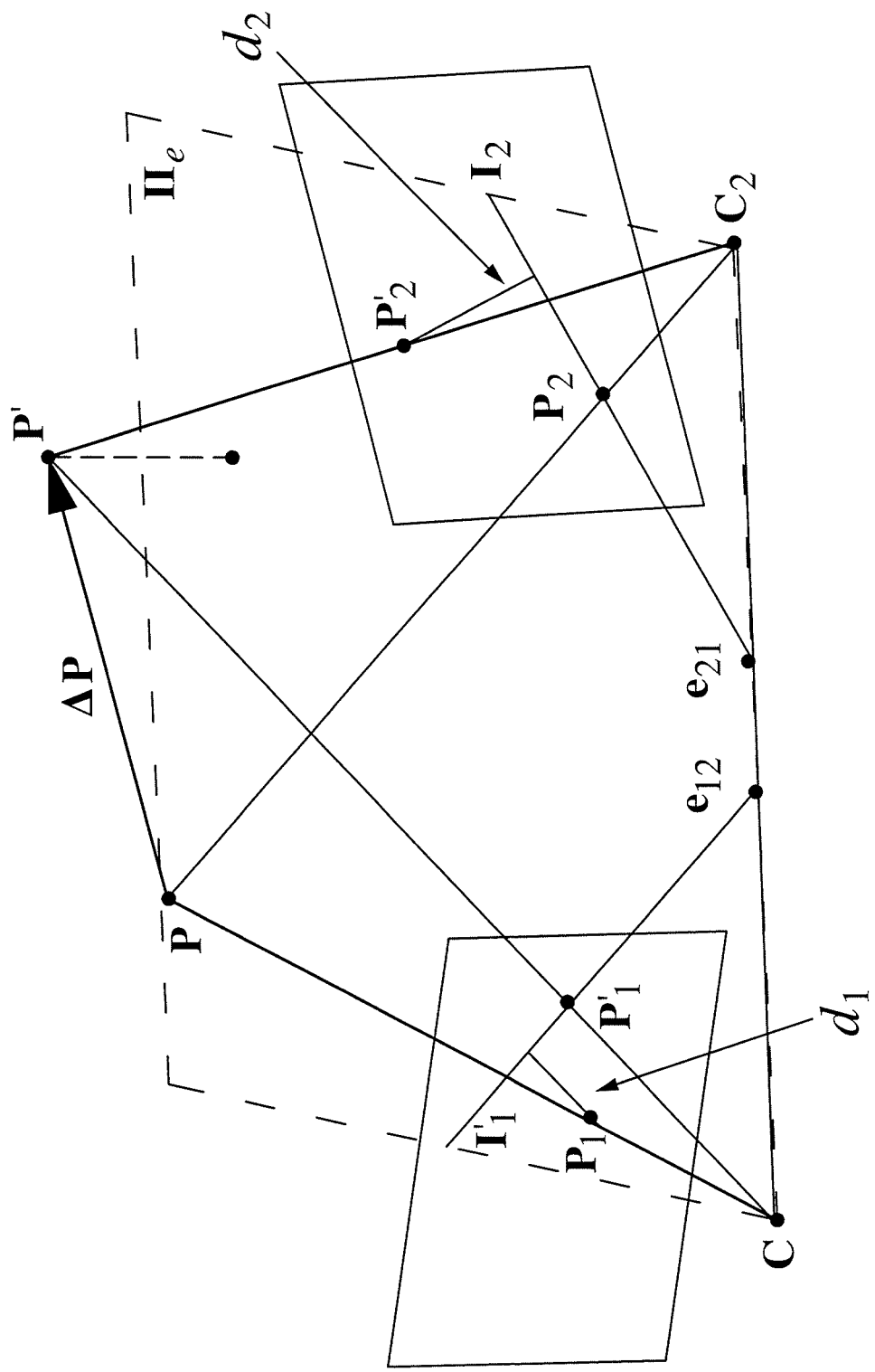
FIG. 4 illustrates an example diagram of an Epipolar Moving Objectness Score (EMS) for point trajectories, according to various aspects of the present disclosure.

As shown in FIG. 2, an epipolar constraint describes the relationship between the projections of a still 3D point between two views by establishing a mapping between points in a left image, and lines in a right image, and vice versa. Epipolar constraints is described by the essential matrix or the fundamental matrix between two cameras. Given m point correspondences of still points in two frames, the following equation is stratified:

$$\begin{bmatrix} x_1 x_1' & x_1 y_1' & x_1 & y_1 x_1' & y_1 y_1' & y_1 & x_1' & y_1' & 1 \\ \vdots & \vdots & \vdots & \vdots & \vdots & \vdots & \vdots & \vdots & \vdots \\ x_m x_m' & x_m y_m' & x_m & y_m x_m' & y_m y_m' & y_m & x_m' & y_m' & 1 \end{bmatrix} \begin{bmatrix} f_{11} \\ f_{21} \\ f_{31} \\ f_{12} \\ f_{22} \\ f_{32} \\ f_{13} \\ f_{23} \\ f_{33} \end{bmatrix} = 0$$

where $f_{ij}$ denotes the coefficients of the fundamental matrix. In the present disclosure, as shown in FIG. 3, an optical flow between consecutive frames may be computed to obtain point correspondence, and generate dense long-term point trajectories. Given two arbitrary frames in an image sequence, for any stationary background point in the scene, the following equation is stratified:

$$x_i^\tau {}^T F_\tau^{\tau'} x_i^{\tau'} = 0 \qquad (1)$$

where $x_i^\tau$ and $x_i^{\tau'}$ are the projections of the 3D point in frame $\tau$ and $\tau'$, respectively, and $F_\tau^{\tau'}$ is the fundamental matrix which encodes the relative pose changes of the camera between the two frames. For any two frames, given the correspondences from point trajectories, F may be estimated using Least Median of Squares (LMEDS). At frame t, fundamental matrices may be estimated between each frame pair from frame $\tau$ to t. Geometrically, the projection of a still point in one view may lie on the epipolar line resulting from the projection in the other view. For a moving object, equation (1) may not hold in general except for a degenerated case which is discussed in more detail below. According to aspects of the present disclosure, as shown in FIG. 4, an epipolar moving objectness score for a pair of point correspondences may be computed based on the epipolar constraint as follows:

$$\phi(x_i^\tau, x_i^{\tau'}) = d_{pl}(F_\tau^{\tau'} x_i^\tau, x_i^{\tau'}) + d_{pl}(x_i^\tau, x_i^{\tau'} F_\tau^{\tau'}) \qquad (2)$$

where $F_\tau^{\tau'} x_i^{\tau'}$ and $x_i^\tau F_\tau^{\tau'}$ define the relative epipolar lines in each view and the function $d_{pl}(\bullet)$ computes the point to line distance. Larger the distance is, the more likely the trajectory is belonging to a moving object. At frame t, given the current set of point trajectories $Z_t$, the fundamental matrices may be estimated using LMEDS and the 8-point algorithm between a current frame T and all the previous frames as long as there are sufficient number of point trajectories exist between that frame and $I_t$. For each trajectory $z_{i,\tau}^t$, one may calculate the epipolar moving objectness score between $x_i^t$ on the current frame and all previous points on the trajectory $\{x_i^\tau, x_i^{\tau+1}, \ldots, x_i^{t-1}\}$.

Figure 5:
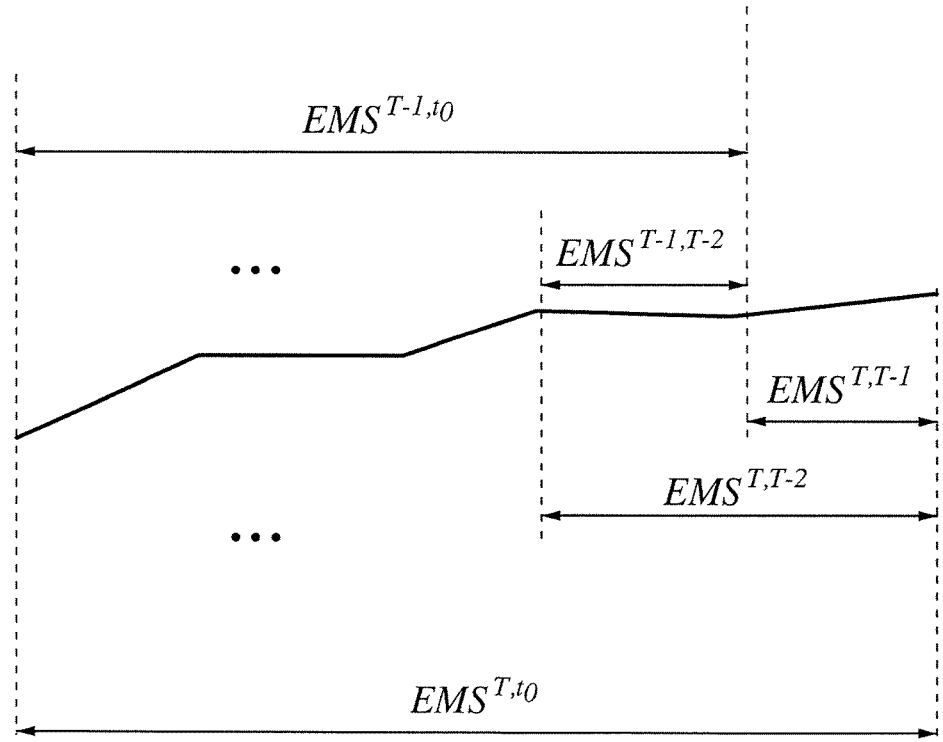
FIG. 5 illustrates an example diagram and table of EMSs for various point trajectories, according to various aspects of the present disclosure.
Figure 6A:
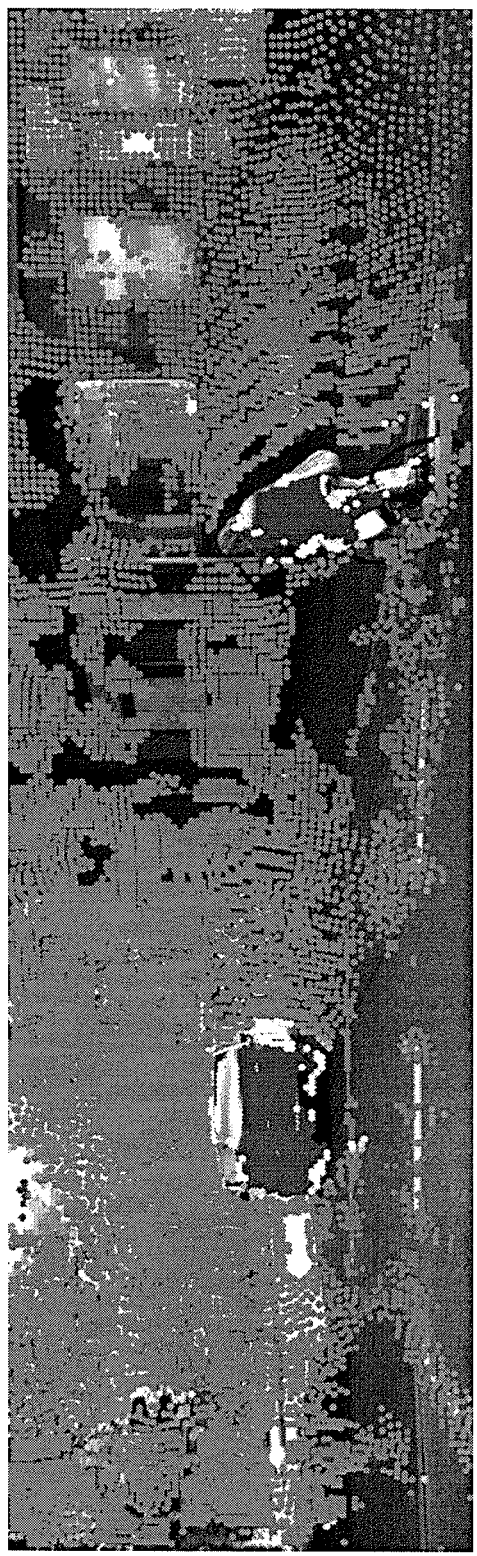
FIGS. 6($a$)-($e$) are example screenshots showing epipolar constraint results, according to various aspects of the present disclosure.
Figure 6B:
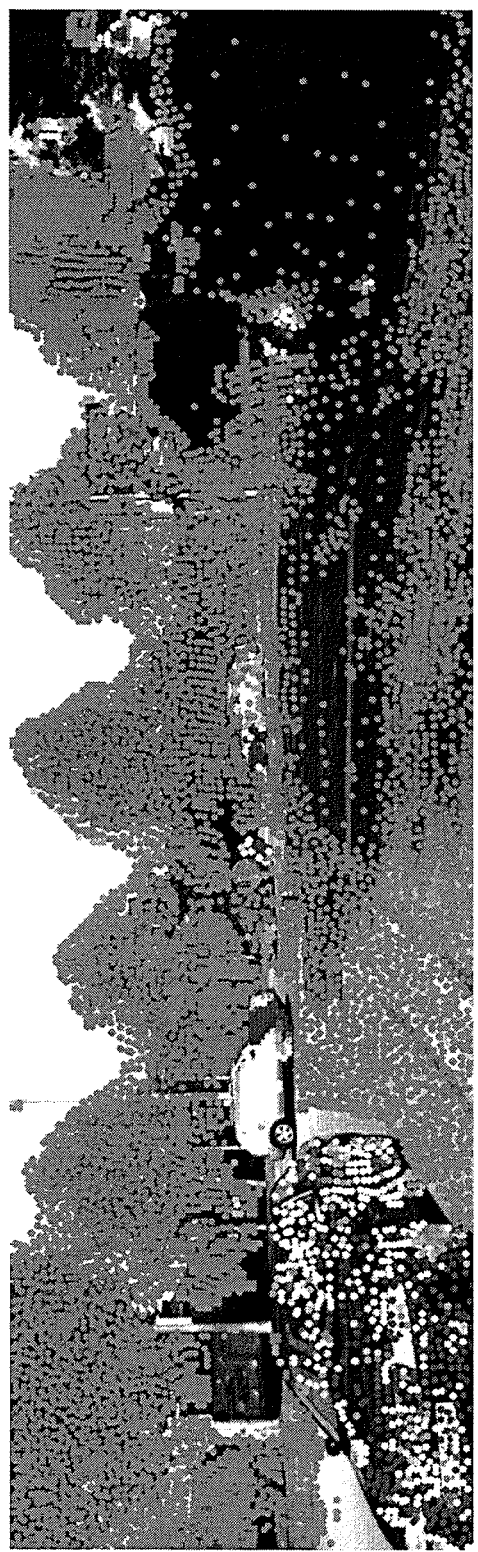
Figure 6C:
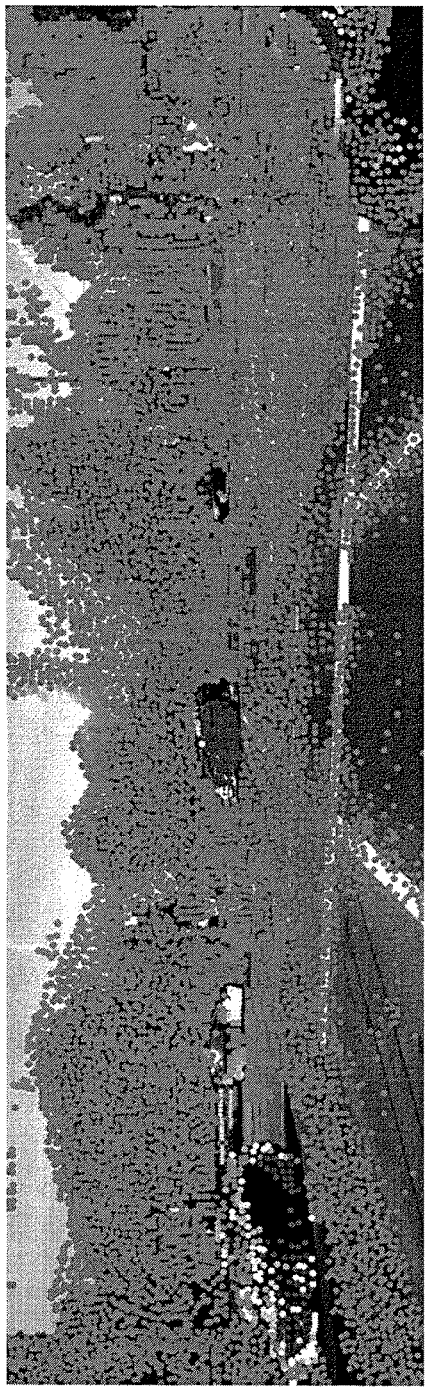
Figure 6D:
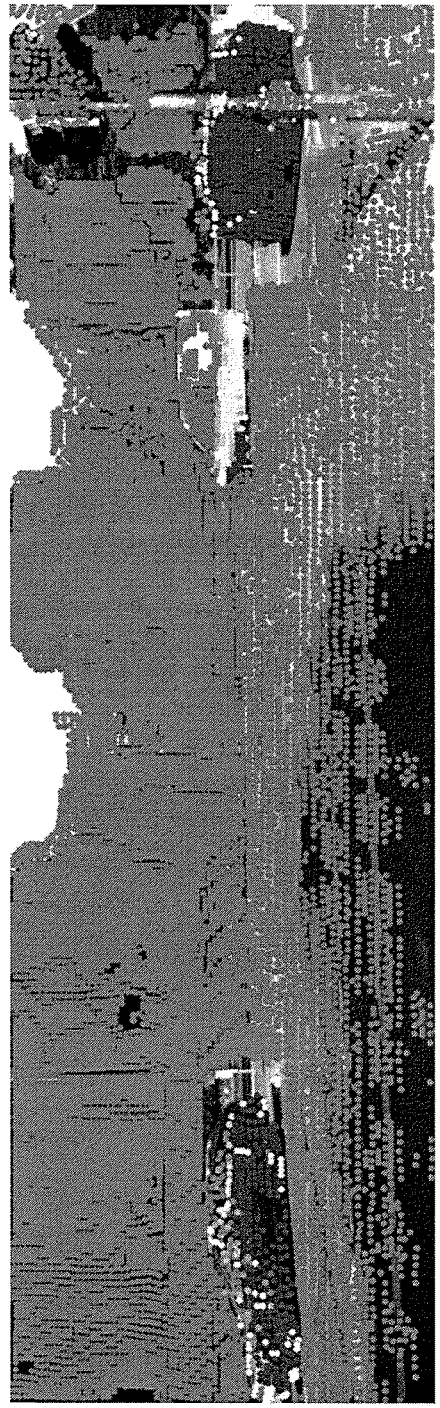
Figure 6E:
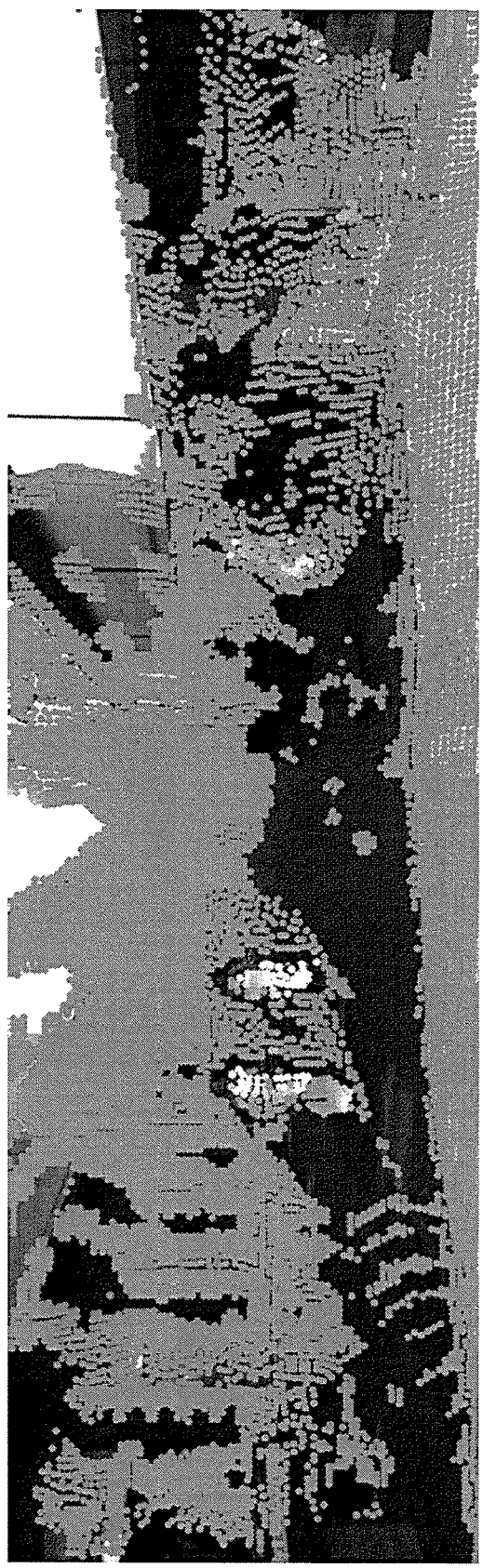

In order to account for a history of a trajectory as shown in FIG. 5, two measures based on a current epipolar moving score (EMS) and a previous EMS may be defined. The first measure may use a weighted average over all of the EMSs of a trajectory, namely, weighted average of EMS ($EMS_{avg}$) which is defined as follows:

$$\Phi(z_{i,\tau}^t) = \frac{1}{B(z_{i,\tau}^t)} \sum_{m=\tau+1}^{t} \beta^{t-m} \sum_{n=\tau}^{m-1} \phi(x_i^m, x_i^n) \qquad (3)$$

Here, $\beta \in [0,1]$ is a decay factor that puts smaller weight on EMS from previous frames and $B(z_{i,\tau}^t) = \sum_{m=\tau+1}^{t} \sum_{n=\tau}^{m-1} \beta^{m-n}$ is a normalization factor, such that the older EMS receives less weight.

In addition to the average epipolar moving objectness score, the change in the error $\phi$ in time may also be analyzed to measure how likely a trajectory is on a moving object. According to aspects of the present disclosure, the assumption may be made that $\phi(x_i^\tau, x_i^{\tau'}) > \phi(x_i^\tau, x_i^{\tau''})$ when $\tau > \tau' > \tau''$. This inequality may specifically hold when the target object persistently moves away from its initial location. Even though this assumption may be considered to be limiting, it is often the case in city-driving scenarios where target objects do not usually return back to the initial location that they are observed. Under this assumption, both $[\phi(x_i^t, x_i^{t-1}), \phi(x_i^t, x_i^{t-2}), \ldots, \phi(x_i^t, x_i^\tau)]$ and $[\phi(x_i^{\tau+1}, x_i^\tau), \phi(x_i^{\tau+2}, x_i^\tau), \ldots, \phi(x_i^t, x_i^\tau)]$ are increasing sequences for $t > \tau$. To capture this intuition, another epipolar moving objectness score may be defined as follows:

$$\Psi(z_{i,\tau}^t) = \frac{1}{\rho(z_{i,\tau}^t)} \sum_{m=\tau+1}^{t} \sum_{n=\tau}^{m-1} [\phi(x_i^m, x_i^n) > \phi(x_i^m, x_i^{n+1}) + \nu]$$

$$\sum_{m=\tau}^{t-1} \sum_{n=m}^{t} [\phi(x_i^m, x_i^n) > \phi(x_i^{m+1}, x_i^n) + \nu]$$

where [•] is an indicator function which is 1 if the input inequality holds and 0 otherwise, $\nu$ is a tolerance variable and $\rho(z_{i,\tau}^t) = (t-\tau)(t-\tau-1)/2$ is the normalization factor.

FIGS. 6(a)-(e) illustrate a number of example epipolar constraint results in detecting moving objects, according aspects of the present disclosure. For example, in FIG. 6(a), the moving vehicle on the left and the cyclist on the right may be detected and identified using the epipolar constraint discussed above. Further, in each of FIGS. 6(b)-(e), not only are the moving objects identified in contrast to the background, but the movement of each moving object is also tracked in real time.

Trifocal Constraint

Figure 7:
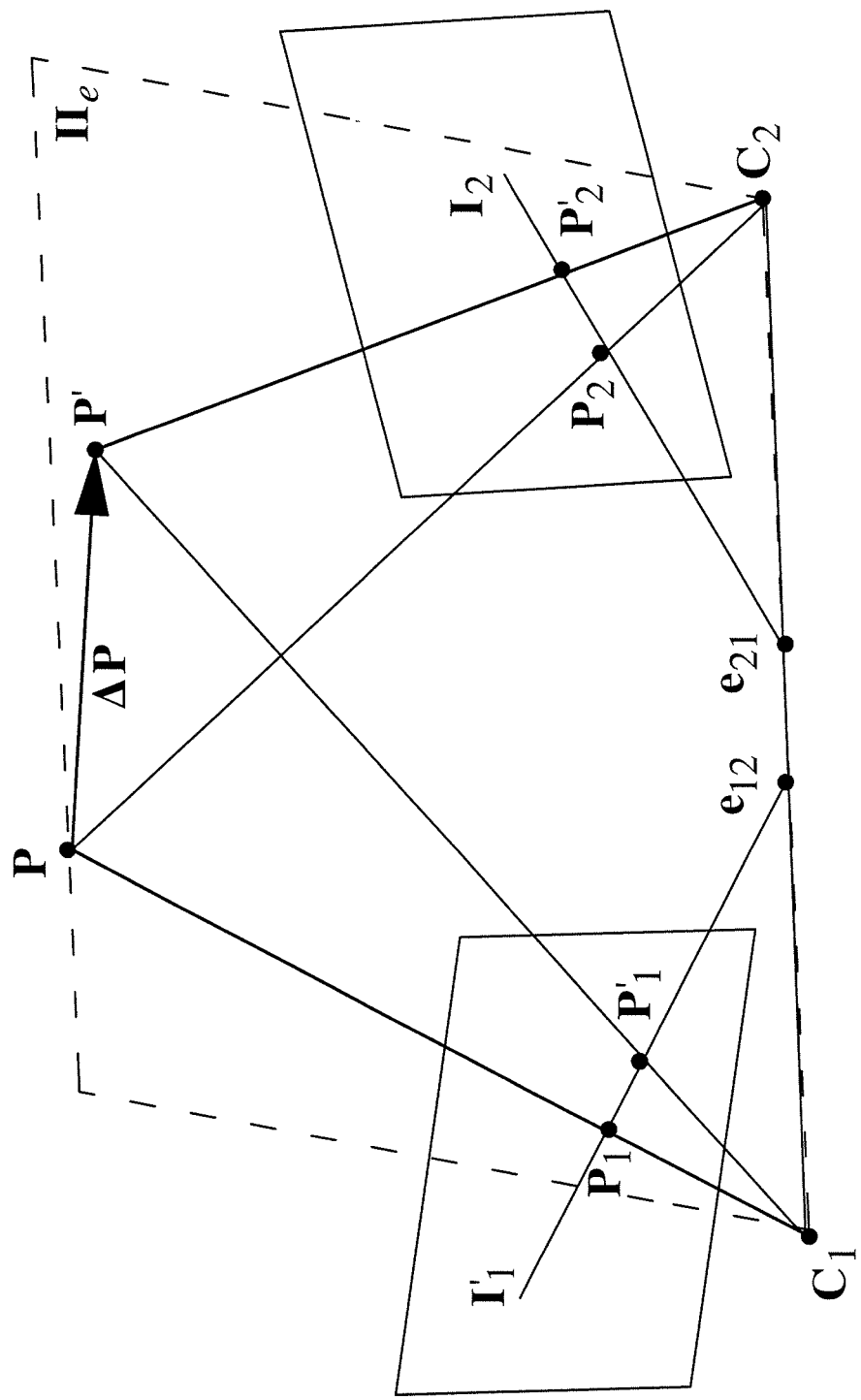
FIG. 7 illustrates an example diagram of a degenerated case of epipolar constraint.
Figure 9A:
FIGS. 9($a$)-($e$) are example screenshots showing trifocal constraint results, according to various aspects of the present disclosure.
Figure 9B:
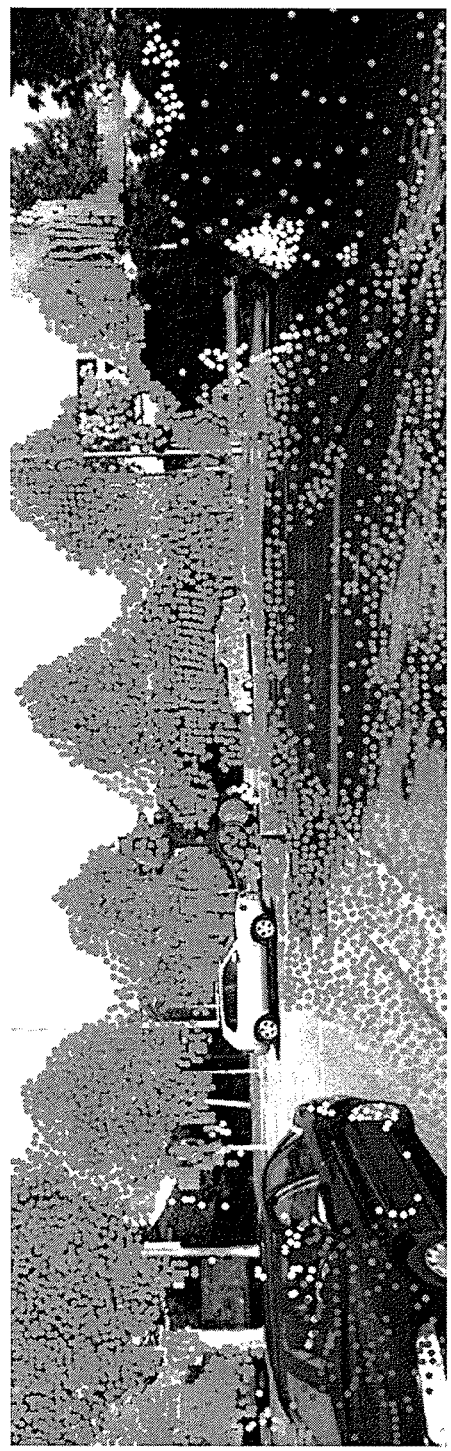
Figure 9C:
Figure 9D:
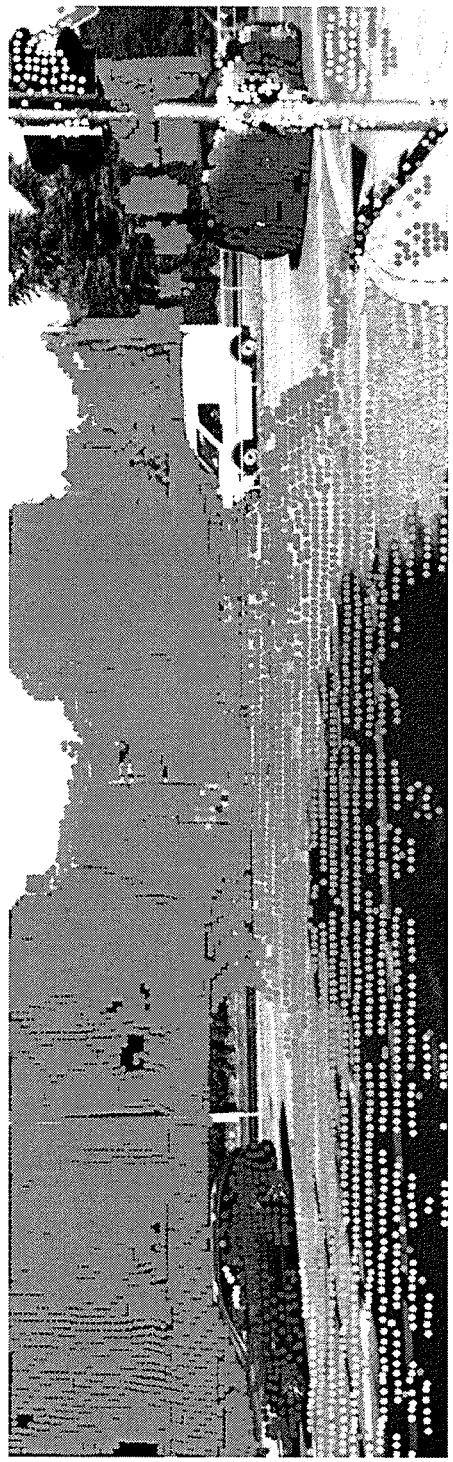
Figure 9E:

Epipolar constraint, however, may not detect a certain type of motion, i.e., when an object moves in the same direction as a camera or, more generally, when the object moves in the epipolar plane. In such cases, a specific point may move along the epipolar line and thus may not be detected by the epipolar constraint. This is referred to as the degenerated case, as shown in FIG. 7. In order to overcome the problems in the degenerated case, a trifocal constraint between three views, as shown in FIG. 8, may be used, by encoding a relation of the projections of a still point or line in three frames, and may be represented by a tensor T. For three point correspondences, the following constraints are satisfied:

$$x_i^{\tau''} = x_i^{\tau'} \sum_{k=1}^{3} x_k^t T_{kjl} + x_j^{\tau'} \sum_{k=1}^{3} x_k^t T_{kil} \quad (4)$$

Here, the subscripts encode three coordinates of the point, and the equation holds for all i, j=1, 2, 3. Unlike in the two view case, the location of the point in the third view may be determined given its locations in two views.

Given the three-view point correspondence $(x_i^m, x_i^n, x_i^p)$, where $t \geq p > n > m \geq \tau$ on trajectory $z_{i,\tau}^t$, a trifocal moving objectness score (TMS) may be defined as follows:

$$\gamma(x_i^m, x_i^n, x_i^p) = d_{pp}(x_i^p, \hat{x}_i^p) \quad (5)$$

where $\hat{x}_i^p$ is the estimated location in the third view using $x^m$ and $x^n$ and $d_{pp}(\bullet)$ computes the Euclidean distance between the points. A trifocal tensor may be estimated using LMEDS, but such estimation of the trifocal tensor is prone to noise. To solve this problem, the epipoles from the fundamental matrices may first be estimated and constraint the epipoles from the trifocal tensor may not be far away from those estimations. Unlike in the epipolar constraint case, the trifocal tensor between the current frame t and t−η and t−2η where η is the frame gap for generating one trifocal moving objectness score for each trajectory $z_{i,\tau}^t$ may be estimated. Moreover, temporal support of the trajectory may be used to compute the weighted average to account for the history, as follows:

$$\Gamma(z_{i,\tau}^t) = \frac{\sum_{m=\tau+2\eta}^{t} \beta^{t-m} \gamma(x_i^m, x_i^n, x_i^p)}{\sum_{m=\tau+2\eta}^{T} \beta^{t-m}} \quad (6)$$

where $\beta \in [0,1]$.

FIGS. 9(a)-(e) illustrate a number of example trifocal constraint results in detecting moving objects, according aspects of the present disclosure. For example, in FIG. 9(a), the moving vehicle on the left and the cyclist on the right may be detected and identified using the trifocal constraint discussed above. Further, in each of FIGS. 9(b)-(e), not only are the moving objects identified in contrast to the background, but the movement of each moving object is also tracked in real time.

Moving Object Segmentation

Figure 10:
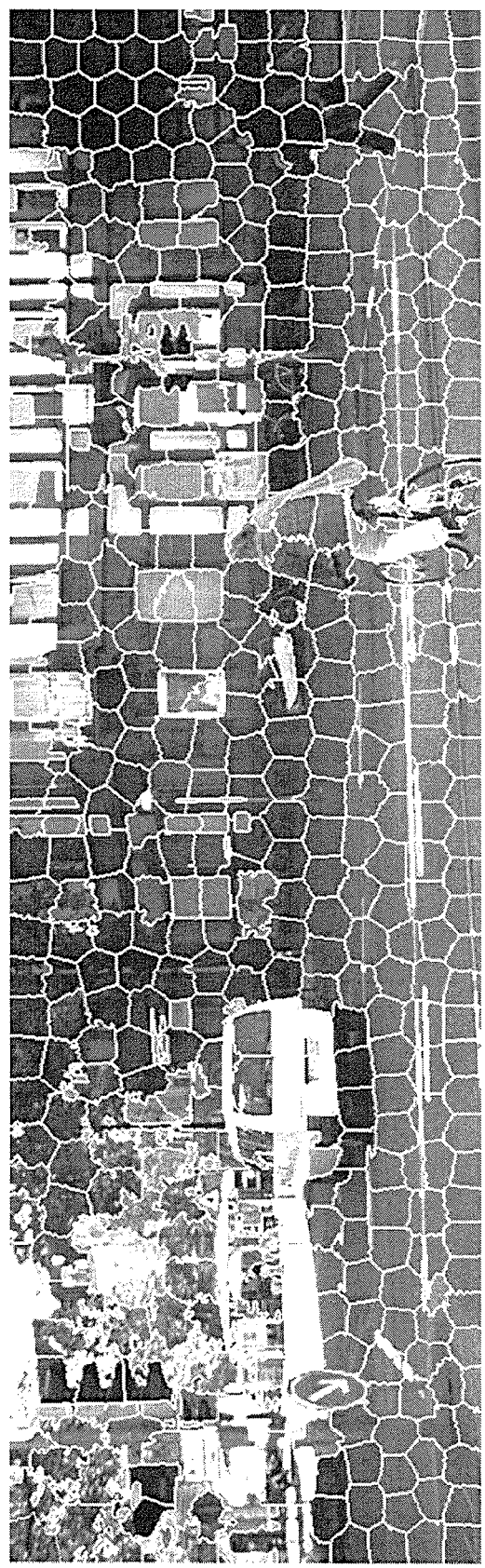
FIG. 10 illustrates an example result of forming a conditional random field (CRF) on superpixels, according to various aspects of the present disclosure.

In view of the above discussion regarding moving objectness/motion scores for point trajectories, such information may be propagated to an entire frame. This may be achieved by first segmenting a frame to obtain superpixels and labeling superpixels with 0/1 labels, where 1 indicates that the superpixel belongs to a moving object, and 0 indicates a static object. Subsequently, a pairwise CRF may be constructed over the superpixels, as shown in FIG. 10. By denoting each superpixel in current frame t as $s_i$ and its corresponding label as $y_i$, $y_i \in y$, the CRF objective may be defined as follows:

$$y = \arg\max \sum_{s_i} w_u E_u(s_i, y_i) + \sum_{(s_i, s_j) \in \varepsilon} w_p E_p(s_i, s_j, y_i, y_j)$$

where $\varepsilon$ is the set of all neighboring superpixel pairs, and $E_u$, $E_p$ denote the unary and pairwise features, respectively. For $E_u$, equations (1)-(6) above for a current frame may be concatenated. Next, the response from point trajectories may be transferred to superpixels by taking the median among all of the trajectories inside the superpixel and labeling "0" if there is no trajectory inside the superpixel for each feature. In order to keep the labeling temporally consistent, another feature may be added to the unary term that encodes the history of point trajectories labeling. At frame t−1, after the superpixel labeling, the labels for point trajectories may be obtained by assigning the label of the superpixel to all point trajectories inside it. At frame t, for each superpixel, the percentage of foreground point trajectories inside it may be computed to ensure a smooth labeling temporally. Alternatively, a temporal CRF may be formed, where superpixels across frames may be linked. The pairwise features $E_p$ between two superpixels may be composed of the Bhattacharyya coefficients between the color and optical flow histograms of the two superpixels. In this optimization problem weight vectors $w_u$ and $w_p$ may be learned via structural Support Vector Machine (SVM), and the optimization problem may be solved via dual decomposition.

Figure 11A:
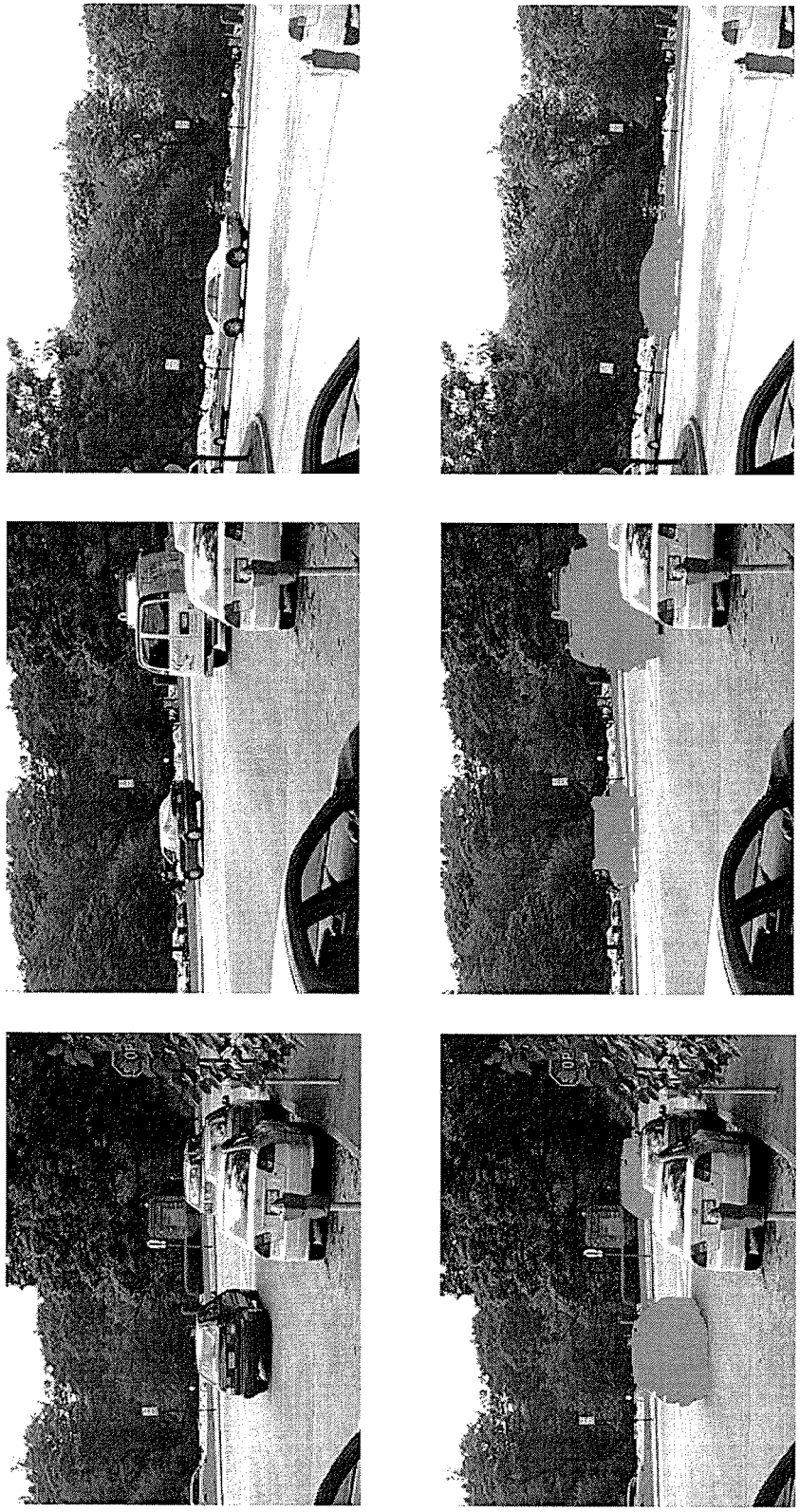
FIGS. 11($a$)-($b$) illustrate example motion segmentation results, according to various aspects of the present disclosure.
Figure 11B:
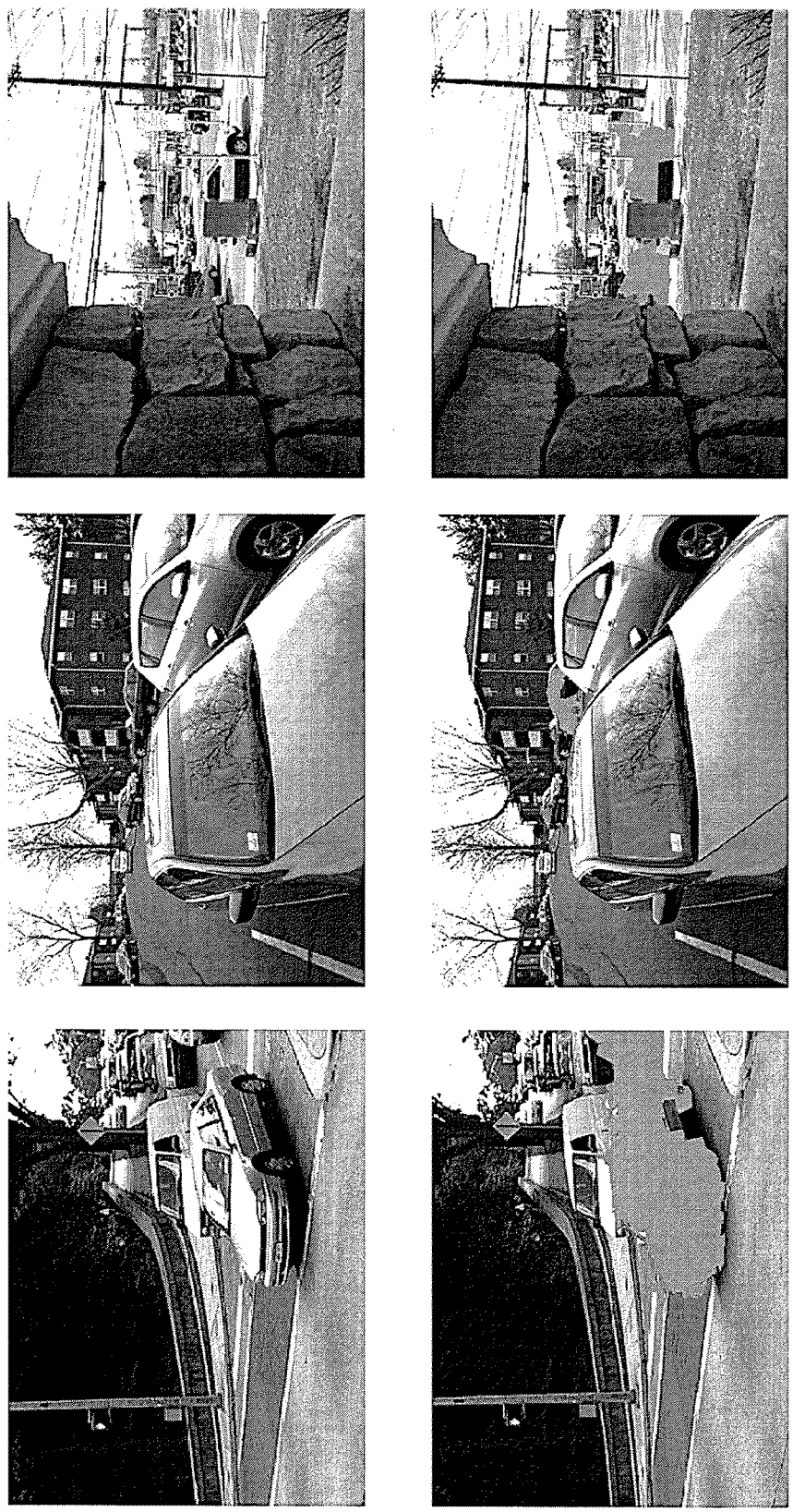
Figure 12A:
FIGS. 12($a$)-($i$) are example screenshots showing additional qualitative results, according to various aspects of the present disclosure.
Figure 12B:
Figure 12C:
Figure 12D:
Figure 12E:
Figure 12F:
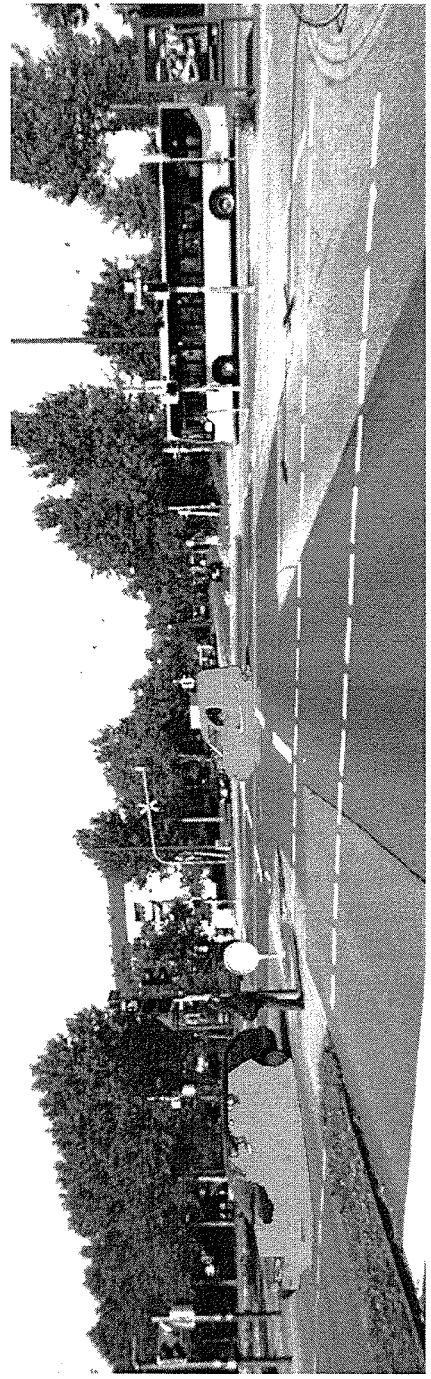
Figure 12G:
Figure 12H:
Figure 12I:
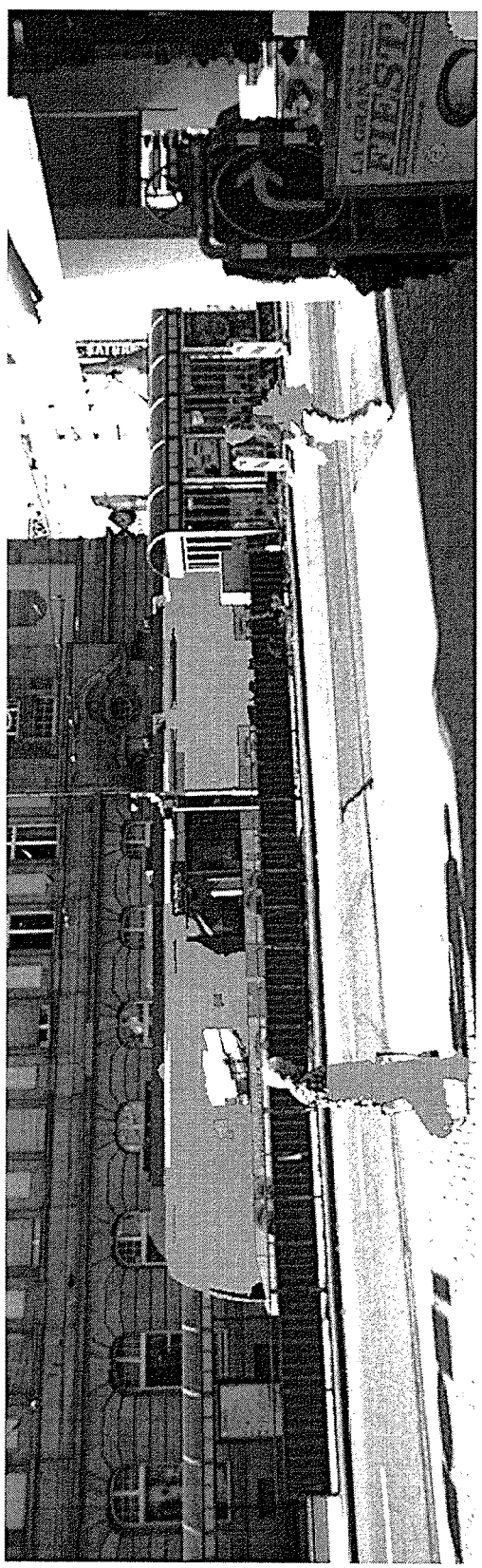

FIGS. 11(a)-(b) illustrate a number of example moving object segmentation results in detecting moving objects, according to aspects of the present disclosure. In addition, FIGS. 12(a)-(i) are example screenshots showing qualitative results in detecting moving objects, according to aspects of the present disclosure. A tracking dataset may be established in connection with various input image sequences. The present disclosure may add a binary label for each object to assist with indicating whether it is moving or not.

Figure 13:
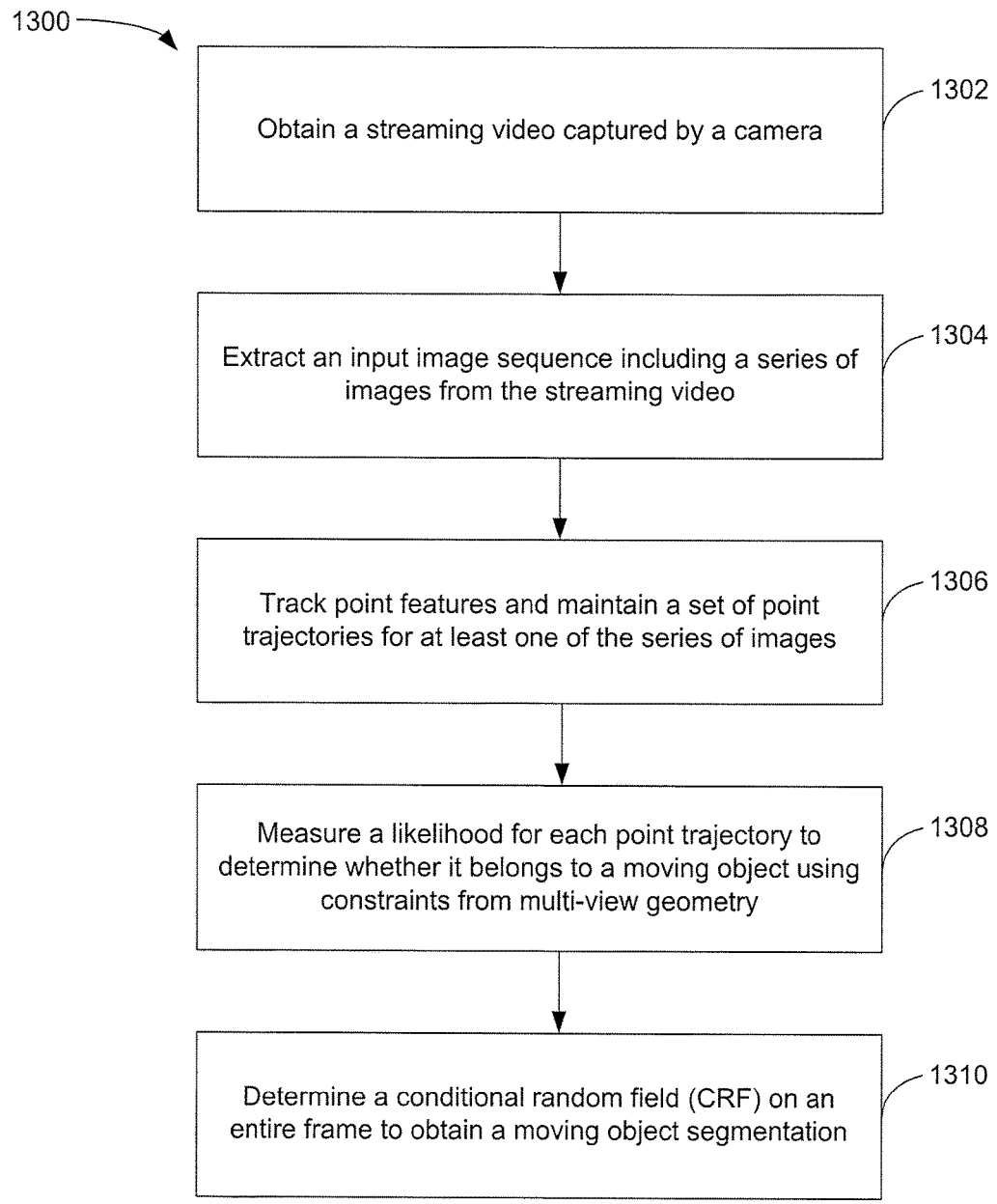
FIG. 13 shows an example flow chart of a method for detecting moving objects, according to various aspects of the current disclosure.

FIG. 13 is an example flow chart illustrating a method 1400 for detecting moving objects, according to various aspects of the current disclosure. In FIG. 13, the method starts at obtaining, at block 1302, a streaming video captured by a camera. The method also includes extracting, at block 1304, an input image sequence including a series of images from the streaming video; tracking point features and maintaining a set of point trajectories for at least one of the series of images at block 1306; measuring a likelihood, for each point trajectory, to determine whether it belongs to a moving object using constraints from multi-view geometry at block 1308; and determining a conditional random field (CRF) on an entire frame to obtain a moving object segmentation at block 1310.

Figure 14:
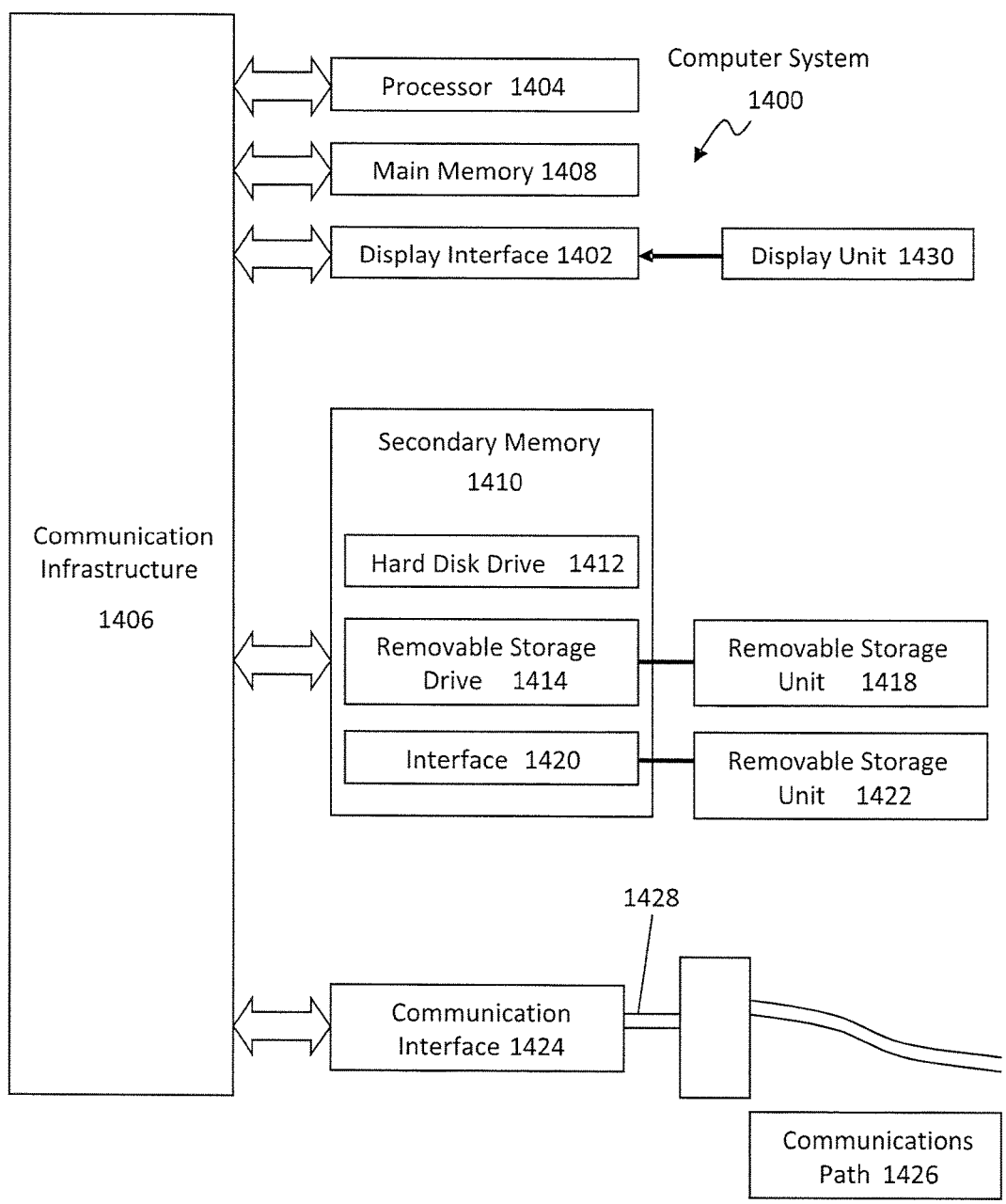
FIG. 14 presents an example system diagram of various hardware components and other features, for use in accordance with an aspect of the present disclosure.

FIG. 14 presents an example system diagram of various hardware components and other features, for use in accordance with an aspect of the present disclosure. The present disclosure may be implemented using hardware, software, or a combination thereof and may be implemented in one or more computer systems or other processing systems. In one aspect, the disclosure is directed toward one or more computer systems capable of carrying out the functionality described herein. An example of such a computer system 1400 is shown in FIG. 14, and the computer systems 1400 may be implemented to perform the method 1300 of FIG. 13.

Computer system 1400 includes one or more processors, such as processor 1404. The processor 1404 is connected to a communication infrastructure 1406 (e.g., a communications bus, cross-over bar, or network). Various software aspects are described in terms of this example computer system. After reading this description, it will become apparent to a person skilled in the relevant art(s) how to implement the disclosure using other computer systems and/or architectures.

Computer system 1400 may include a display interface 1402 that forwards graphics, text, and other data from the communication infrastructure 1406 (or from a frame buffer not shown) for display on a display unit 1430. Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, and the like. The removable storage drive 1414 reads from and/or writes to a removable storage unit 1418 in a well-known manner. Removable storage unit 1418, represents a floppy disk, magnetic tape, optical disk, and the like, which is read by and written to removable storage drive 1414. As will be appreciated, the removable storage unit 1418 includes a computer usable storage medium having stored therein computer software and/or data.

In alternative aspects, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a Personal Computer Memory Card International Association (PCMCIA) slot and card, and the like. Software and data transferred via communications interface 1424 are in the form of signals 1428, which may be electronic, electromagnetic, optical or other signals capable of being received by communications interface 1424. These signals 1428 are provided to communications interface 1424 via a communications path (e.g., channel) 1426. This path 1426 carries signals 1428 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1480, a hard disk installed in hard disk drive 1470, and signals 1428. These computer program products provide software to the computer system 1400. The disclosure is directed to such computer program products.

Computer programs (also referred to as computer control logic) are stored in main memory 1408 and/or secondary memory 1410. Computer programs may also be received via communications interface 1424. Such computer programs, when executed, enable the computer system 1400 to perform the features of the present disclosure, as discussed herein. In particular, the computer programs, when executed, enable the processor 1410 to perform the features of the present disclosure. Accordingly, such computer programs represent controllers of the computer system 1400.

In an aspect where the disclosure is implemented using software, the software may be stored in a computer program product and loaded into computer system 1400 using removable storage drive 1414, hard drive 1412, or communications interface 1420. The control logic (software), when executed by the processor 1404, causes the processor 1404 to perform the functions of the disclosure as described herein. In another aspect, the disclosure is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the disclosure is implemented using a combination of both hardware and software.

Figure 15:
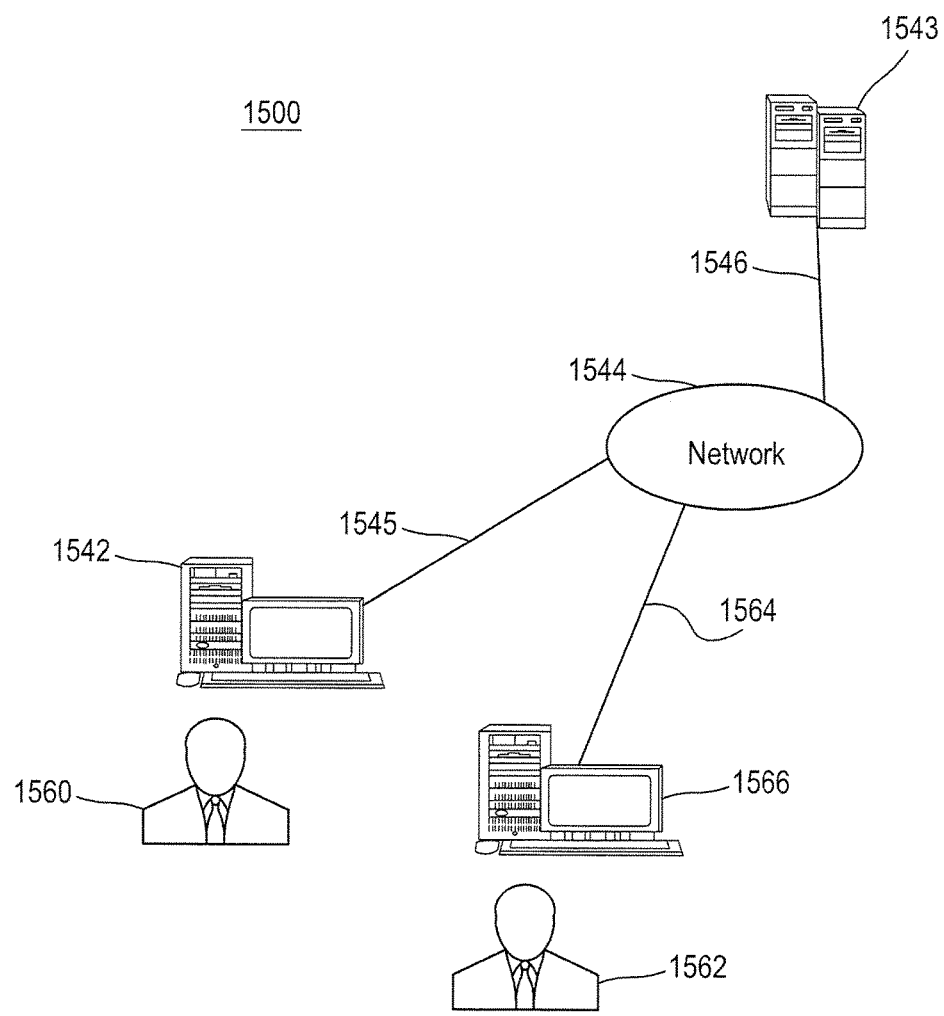
FIG. 15 is an example block diagram of various example system components, in accordance with an aspect of the present disclosure.

FIG. 15 is a block diagram of various example system components, in accordance with an aspect of the present disclosure. FIG. 15 shows a communication system 1500 usable in accordance with the present disclosure. The communication system 1500 includes one or more accessors 1560, 1562 (also referred to interchangeably herein as one or more "users") and one or more terminals 1542, 1566. In one aspect, data for use in accordance with the present disclosure is, for example, input and/or accessed by accessors 1560, 1562 via terminals 1542, 1566, such as personal computers (PCs), minicomputers, mainframe computers, microcomputers, telephonic devices, or wireless devices, such as personal digital assistants ("PDAs") or a hand-held wireless devices coupled to a server 1543, such as a PC, minicomputer, mainframe computer, microcomputer, or other device having a processor and a repository for data and/or connection to a repository for data, via, for example, a network 1544, such as the Internet or an intranet, and couplings 1545, 1546, 1564. The couplings 1545, 1546, 1564 include, for example, wired, wireless, or fiberoptic links. In another aspect, the method and system of the present disclosure operate in a stand-alone environment, such as on a single terminal.

While aspects of this disclosure have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the disclosure, as set forth above, are intended to be illustrative, not limiting. Various changes may be made without departing from the spirit and thereof. Therefore, aspects of the disclosure are intended to embrace all known or later-developed alternatives, modifications, variations, improvements, and/or substantial equivalents.

What is claimed is:

1. A computer-implemented method for detecting moving objects, comprising:
   obtaining a streaming video captured by a camera;
   extracting an input image sequence including a series of images from the streaming video;
   tracking point features and maintaining a set of point trajectories for at least one of the series of images;
   measuring a likelihood for each point trajectory to determine whether it belongs to a moving object using constraints from multi-view geometry, wherein the constraints from multi-view geometry comprise at least one of: an epipolar constraint between two-view and trifocal constraints from three-view; and
   determining a conditional random field (CRF) on an entire frame to obtain a moving, object segmentation.

2. The method of claim 1, wherein the camera comprises a monocular camera.

3. The method of claim 1, wherein the epipolar constraint is calculated based at least in part on an epipolar moving objectness score for a pair of point correspondence as follows:

$$\phi(x_i^\tau, x_i^{\tau'}) = d_{pl}(F_\tau^{\tau'} x_i^{\tau'}, x_i^\tau) + d_{pl}(x_i^{\tau'}, x_i^\tau F_\tau^{\tau'}),$$

where $F_\tau^{\tau'} x_i^{\tau'}$ and $x_i^\tau F_\tau^{\tau'}$ define relative epipolar lines in each view and a function $d_{pl}(\bullet)$ computes a point to line distance.

4. The method of claim 3, wherein the pair of point correspondence is determined based on an optical flow between consecutive frames.

5. The method of claim 3, further comprising determining a weighted average of all epipolar moving objectness scores of a trajectory as follows:

$$\Phi(z_{i,\tau}^t) = \frac{1}{B(z_{i,\tau}^t)} \sum_{m=\tau+1}^{t} \beta^{t-m} \sum_{n=\tau}^{m-1} \phi(x_i^m, x_i^n),$$

where $\beta$ is a decay factor.

6. The method of claim 3, further comprising determining another epipolar moving objectless score as follows:

$$\Psi(z_{i,\tau}^t) = \frac{1}{\rho(z_{i,\tau}^t)} \sum_{m=\tau+1}^{t} \sum_{n=\tau}^{m-1} [\phi(x_i^m, x_i^n) > \phi(x_i^m, x_i^{n+1}) + v]$$

$$\sum_{m=\tau}^{t-1} \sum_{n=m}^{t} [\phi(x_i^m, x_i^n) > \phi(x_i^{m+1}, x_i^n) + v],$$

where [•] is an indicator function, $v$ is a tolerance variable and $\rho(z_{i,\tau}^t) = (t-\tau)(t-\tau-1)/2$ is the normalization factor.

7. The method of claim 1, wherein the trifocal constraints from three-view are determined based at least in part on a trifocal moving objectless score defined as follows:

$$\gamma(x_i^m, x_i^n, x_i^p) = d_{pp}(x_i^p, \hat{x}_i^p),$$

where $\hat{x}^{t''}$ is the estimated location in the third view using $x^t$ and $x^{t'}$ and $d_{pp}(\bullet)$ computes the Euclidean distance.

8. The method of claim 7, further comprising determining a weighted average of all trifocal moving objectness scores to account for a history, for each trajectory as follows:

$$\Gamma(z_{i,\tau}^t) = \frac{\sum_{m=\tau+2\eta}^{t} \beta^{t-m} \gamma(x_i^m, x_i^n, x_i^p)}{\sum_{m=\tau+2\eta}^{T} \beta^{t-m}},$$

where $\beta$ is a decay factor.

9. A system for detecting moving objects, the system comprising:
   a camera;
   a memory; and
   a processor communicatively coupled with the memory and the camera, the processor configured to:
   obtain a streaming, video captured by a camera;
   extract an input image sequence including a series of images from the streaming video;
   track point features and means for maintaining a set of point trajectories for at least one of the series of images;
   measure a likelihood for each point trajectory to determine whether it belongs to a moving object using constraints from multi-view geometry, wherein the constraints from multi-view geometry comprise at least one of: an epipolar constraint between two-view and trifocal constraints from three-view; and
   determine a conditional random field (CRF) on an entire frame to obtain a dense moving object segmentation.

10. The system of claim 9, wherein the epipolar constraint is calculated based at least in part on an epipolar moving objectness score for a pair of point correspondence as follows:

$$\phi(x_i^\tau, x_i^{\tau'}) = d_{pl}(F_\tau^{\tau'} x_i^{\tau'}, x_i^\tau) + d_{pl}(x_i^{\tau'}, x_i^\tau F_\tau^{\tau'}),$$

where $F_\tau^{\tau'} x_i^{\tau'}$ and $x_i^\tau F_\tau^{\tau'}$ define relative epipolar lines in each view and a function $d_{pl}(\bullet)$ computes a point to line distance.

11. The system of claim 10, wherein the processor is configured to determine a weighted average of all epipolar moving objectness scores of a trajectory as follows:

$$\Phi(z_{i,\tau}^t) = \frac{1}{B(z_{i,\tau}^t)} \sum_{m=\tau+1}^{t} \beta^{t-m} \sum_{n=\tau}^{m-1} \phi(x_i^m, x_i^n),$$

where $\beta$ is a decay factor.

12. The system of claim 10, wherein the processor is configured to determine another epipolar moving objectness score as follows:

$$\Psi(z_{i,\tau}^t) = \frac{1}{\rho(z_{i,\tau}^t)} \sum_{m=\tau+1}^{t} \sum_{n=\tau}^{m-1} [\phi(x_i^m, x_i^n) > \phi(x_i^m, x_i^{n+1}) + v]$$

$$\sum_{m=\tau}^{t-1} \sum_{n=m}^{t} [\phi(x_i^m, x_i^n) > \phi(x_i^{m+1}, x_i^n) + v],$$

where [•] is an indicator function, $v$ is a tolerance variable and $\rho(z_{i,\tau}^t) = (t-\tau)(t-\tau-1)/2$ is the normalization factor.

13. The system of claim 9, wherein the trifocal constraints from three-view is determined based at least in part on a trifocal moving objectness score as follows:

$$\gamma(x_i^m, x_i^n, x_i^p) = d_{pp}(x_i^p, \hat{x}_i^p),$$

where $\hat{x}^{t''}$ is the estimated location in the third view using $x^t$ and $x^{t'}$ and $d_{pp}(\bullet)$ computes the Euclidean distance.

14. The system of claim 13 wherein the processor is configured to determine a weighted average of all trifocal moving objectness scores to account for a history for each trajectory as follows:

$$\Gamma(z_{i,\tau}^t) = \frac{\sum_{m=\tau+2\eta}^{t} \beta^{t-m} \gamma(x_i^m, x_i^n, x_i^p)}{\sum_{m=\tau+2\eta}^{T} \beta^{t-m}},$$

where $\beta$ is a decay factor.

15. The system of claim 9, wherein the camera comprises a monocular camera.

16. A non-transitory computer readable storage medium having control logic stored thereon for causing a computer to detect moving objects, the control logic comprising machine executable codes for:

obtaining a streaming video captured by a camera;

extracting an input image sequence including a series of images from the streaming video;

tracking point features and maintaining a set of point trajectories for at least one of the series of images;

measuring a likelihood for each point trajectory to determine whether it belongs to a moving object using constraints from multi-view geometry, wherein the constraints from multi-view geometry comprise at least one of: an epipolar constraint between two-view and trifocal constraints from three-view; and determining a conditional random field (CRF) on an entire frame to obtain a dense moving object segmentation.

17. The non-transitory computer readable storage medium of claim 16, wherein the camera comprises a monocular camera.

\* \* \* \* \*